United States Patent
Youn et al.

(10) Patent No.: US 10,512,001 B2
(45) Date of Patent: Dec. 17, 2019

(54) METHOD FOR REARRANGING GATEWAY AND METHOD FOR GENERATING DEDICATED BEARER

(71) Applicant: LG Electronics Inc., Seoul (KR)

(72) Inventors: Myungjune Youn, Seoul (KR); Jinsook Ryu, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 15/749,254

(22) PCT Filed: Aug. 16, 2016

(86) PCT No.: PCT/KR2016/008976
§ 371 (c)(1),
(2) Date: Jan. 31, 2018

(87) PCT Pub. No.: WO2017/030343
PCT Pub. Date: Feb. 23, 2017

(65) Prior Publication Data
US 2018/0227807 A1 Aug. 9, 2018

Related U.S. Application Data

(60) Provisional application No. 62/205,754, filed on Aug. 17, 2015.

(51) Int. Cl.
*H04W 36/00* (2009.01)
*H04W 36/12* (2009.01)
(Continued)

(52) U.S. Cl.
CPC ........ *H04W 36/0011* (2013.01); *H04W 36/12* (2013.01); *H04W 36/38* (2013.01);
(Continued)

(58) Field of Classification Search
CPC ..... H04W 36/00; H04W 36/12; H04W 88/16; H04W 36/0011; H04W 36/38; H04W 72/042
See application file for complete search history.

(56) References Cited

U.S. PATENT DOCUMENTS

2010/0142488 A1* 6/2010 Zhang ............... H04W 36/0022
370/332
2011/0122845 A1* 5/2011 Meirosu ............ H04W 36/0055
370/332
(Continued)

FOREIGN PATENT DOCUMENTS

KR 10-2015-0045396 A 4/2015
WO 2015/069551 A1 5/2015

*Primary Examiner* — Brian D Nguyen
(74) *Attorney, Agent, or Firm* — Dentons US LLP

(57) ABSTRACT

An embodiment of the present description provides a method for rearranging a gateway by a node, which is in charge of a control plane, for a user equipment (UE) in a mobile communication network. The method can comprise the steps of: if a UE performs a handover and both the UE and an opponent device communicating with the UE are capable of supporting rearrangement of a gateway, determining an appropriate gateway for the UE to be rearranged; and transmitting a rearrangement indication to the UE on the basis of the determination.

9 Claims, 18 Drawing Sheets

(51) Int. Cl.
*H04W 36/38* (2009.01)
*H04W 88/16* (2009.01)
*H04W 72/04* (2009.01)

(52) U.S. Cl.
CPC .......... *H04W 88/16* (2013.01); *H04W 36/125* (2018.08); *H04W 72/042* (2013.01)

(56) References Cited

U.S. PATENT DOCUMENTS

| | | | |
|---|---|---|---|
| 2012/0224564 A1* | 9/2012 | Paisal | H04N 7/148 370/331 |
| 2013/0294413 A1 | 11/2013 | Kim et al. | |
| 2014/0016614 A1* | 1/2014 | Velev | H04W 4/70 370/331 |
| 2014/0043993 A1 | 2/2014 | Sirotkin et al. | |
| 2014/0098812 A1 | 4/2014 | Korhonen et al. | |

* cited by examiner

METHOD FOR REARRANGING GATEWAY AND METHOD FOR GENERATING DEDICATED BEARER

CROSS-REFERENCE TO RELATED APPLICATIONS

This application is the National Stage filing under 35 U.S.C. 371 of International Application No. PCT/KR2016/008976, filed on Aug. 16, 2016, which claims the benefit of U.S. Provisional Application No. 62/205,754 filed on Aug. 17, 2015, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
| --- | --- |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. When the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

In the 4th mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a cell having a small radius, such as a pico cell is adopted, a band higher than a frequency used in the existing cellular system may be used, and as a result, it is possible to transfer more information. However, since more base stations should be installed in the same area, higher cost is required.

In recent years, a Femto base station such as a Home (e)NodeB 30 has been proposed while making the approach to increase the cell capacity by using the small cell.

The Home (e)Node 30 has been researched based on a RAN WG3 of the 3GPP Home (e)NodeB and in recent years, the Home (e)NodeB 30 has been in earnest researched even in an SA WG.

FIG. 6 is a diagram illustrating the relationship between (e)NodeB and Home (e)NodeB.

The (e)NodeB 20 illustrated in FIG. 6 corresponds to a macro base station and the Home (e)NodeB 30 illustrated in FIG. 6 may correspond to the Femto base station. In the specification, (e)NodeB intends to be described based on terms of the 3GPP and (e)NodeB is used when NodeB and eNodeB are mentioned together. Further, Home (e)NodeB is used when Home NodeB and Home eNodeB are mentioned together.

Interfaces marked with dotted lines are used to transmit control signals among the (e)NodeB 20, the Home (e)NodeB 30, and an MME 51. In addition, interfaced marked with solid lines are used to transmit data of the user plane.

Meanwhile, recently, with an explosive increase in data, there is a problem in that congestion occurs in a core network of a mobile communication operator, that is, the S-GW 52 and P-GW 53 in the EPC.

In order to solve this problem, the mobile communication operators have changed the S-GW 52 and the PDN-GW 53 to have a high capacity, or have added new equipment, which may lead to a disadvantage of requiring a significantly high cost. Further, an amount of data to be transmitted and received is exponentially increased day by day, which immediately leads to a disadvantage of overloading.

Meanwhile, various methods of optimizing the S-GW 52 and the PDN-GW 53 have been proposed without having to add the mobile communication network. For example, it has been proposed a technique (i.e., selected IP traffic offload (i.e., SIPTO)) for offloading a path via nodes of a public network, i.e., a wired network, without having to perform transmission/reception via the path through the mobile communication operator's network 60.

FIG. 7 shows the concept of a selected IP traffic offload (SIPTO).

As can be seen with reference to FIG. 7, an SIPTO technique offloads specific IP traffic (e.g., an Internet service) of a UE 10 to nodes of a wired network 700 without having to pass through nodes in an IP service network 600 of a mobile communication operator.

For example, traffic of the UE may be offloaded to the wireless network 700 such as a public communication network by applying the SIPTO to pass through a local network through a home (e)NodeB. This may be called an 'SIPTO at local network' scheme.

Alternatively, the traffic of the UE through an (e)NodeB may be offloaded to the wired network 700 such as the public communication network. This may be called an 'SIPTO above RAN' scheme.

FIG. 8 shows an example of a traffic path according to whether SIPTO is applied in a home (e)NodeB.

Referring to FIG. 8, an SIPTO technique offloads specific IP traffic (e.g., an Internet service) of a UE 10 to nodes of a wired network, as indicated by a dotted line, without having to pass through nodes in a mobile communication operator's network 60.

When the SIPTO is applied to a path through a home (e)NodeB, a function of a P-GW is additionally required in a local network in which a home (e)NodeB 30 is used. The P-GW added to the local network is called a P-GW 53'.

As such, when the SIPTO technology is used, the P-GW for the UE needs to be reselected or relocated to the P-GW 53'.

That is, the SIPTO technique can reduce an overload of an EPC by offloading traffic to a P-GW closest to the UE. For this, the UE shall be able to select the closest P-GW.

The aforementioned SIPTO technique has been gradually improved according to the 3GPP release.

First, according to the 3GPP release 10 in which the SIPTO is first standardized, a user experiences a temporary disruption of a service since seamless offloading is not supported. This will be described below in detail. First, when the UE moves to another base station, as a result of the movement, a target MME may reselect or relocate a P-GW which is more appropriate for a current location of the UE (e.g., a P-GW geographically closer to the location of the UE or a P-GW topologically closer thereto), and may determine to redirect a PDN connection of the UE to the reselected (or relocated) P-GW. As such, when the MME determines to reselect (or relocate) the P-GW, the MME performs a PDN disconnection procedure in which the UE is instructed of "reactivated requested" with respect to a PDN connection to be redirected. If it is determined to relocate all PDN connections for the UE, the MME performs a detach procedure so that the UE is instructed of "explicit detach with reattach required".

However, if there is an application being executed by the UE during the reselection (or relocation) procedure of the P-GW is performed (that is, if there is traffic to be transmitted/received via an original P-GW), a service may be temporarily disrupted due to an IP address change of the UE according to the reselection (or relocation) of the P-GW.

To solve this service disruption problem, in 3GPP release 11, the MME is allowed to disconnect a PDN connection to perform P-GW reselection (or relocation) caused by SIPTO only during: i) the UE is in an idle mode; or ii) the UE performs a tracking area update (TAU) procedure in which a bearer of a user plane is not created. Accordingly, even if the UE moves in a connected mode, despite a different P-GW is more appropriate for the current location of the UE, the MME does not perform reselection (or relocation) with respect to the different P-GW.

However, when the UE is in the connected mode, there is no proposed method for reselecting (or relocating) the P-GW more appropriate for the current location of the UE while minimizing a service disruption.

Therefore, when the UE is in the connected mode, there is a problem in that user's traffic cannot be delivered to the more appropriate P-GW. This will be described in detail with reference to FIG. 9A and FIG. 9B.

FIG. 9A shows an example in which an 'SIPTO above RAN' scheme is applied when a UE moves.

As shown on the left side of FIG. 9A, the UE uses a PDN#1 which passes through an eNodeB#1, an S-GW#1, and a P-GW#1 by using an IP address#1. Thereafter, when the UE moves (e.g., TAU or handover), the PDN#1 passes through an eNodeB#2, an S-GW#2, and the P-GW#1. In this case, an MME performs a P-GW relocation procedure, in order to allow the PDN#1 to pass through the P-GW#2 located closer to the UE. In addition, the MME performs a procedure for deactivating the PDN#1. When the PDN#1 is deactivated, the MME allows the UE to perform a detach procedure for a reattach. After the detach procedure, the UE performs a reattach, and creates a new PDN#2. The new PDN#2 is created to pass through the P-GW#2 closer to the UE.

As described above, in order to relocate the P-GW, the UE first has to perform the detach procedure, and thus a service is disrupted.

FIG. 9B shows an example of applying an 'SIPTO at local network' scheme when a UE moves.

As shown on the left side of FIG. 9B, the UE uses a PDN#1 which passes through an eNodeB#1, an S-GW#1, and a P-GW#1 by using an IP address#1. Thereafter, when the UE moves (e.g., TAU or handover), the PDN#1 passes through a home (e)NodeB, the S-GW#1, and the P-GW#1. In this case, an MME performs a P-GW relocation procedure, in order to allow the PDN#1 to pass through the P-GW located closer to the UE. In addition, the MME performs a procedure for deactivating the PDN#1. When the PDN#1 is deactivated, the MME allows the UE to perform a detach procedure for a reattach. After the detach procedure, the UE performs a reattach, and creates a new PDN#2. The new PDN#2 is created to pass through a local P-GW closer to the UE.

As described above, in order to relocate the P-GW, the UE first has to perform the detach procedure, and thus a service is disrupted.

Meanwhile, since the 'conventional SIPTO at local network' scheme does not support continuity of an IP data session, when the UE moves from the home (e)NodeB to a different base station, the PDN#2 connection is not handed over, and thus shall be re-established. Therefore, when the UE moves from the home (e)NodeB to the different base station, the home (e)NodeB releases its resource related to the UE, and requests the local P-GW to re-establish the PDN#2 connection. Then, the local P-GW drives a timer, and when the timer expires, releases the PDN#2 connection, and performs a bearer deactivation procedure.

As such, since the PDN connection is disconnected, the service is disrupted.

As described up to now, the conventional technique for offloading traffic, that is, the SIPTO above RAN scheme and the SIPTO at local network scheme, has to disconnect the existing PDN and create a new PDN. In this process, all services using the existing PDN are disrupted, which causes inconvenience to a user.

SUMMARY OF THE INVENTION

Accordingly, one disclosure of this specification is to propose a scheme capable of solving the aforementioned problems.

To achieve the above purpose, a disclosure of the present specification provides a method of changing a packet data network-gateway (P-GW) to offload traffic of a user equipment (UE) in a connected mode without a service disruption.

Specifically, to achieve the above purpose, a disclosure of the present specification provides a method of relocating a gateway by a node, which is in charge of a control plane, for a user equipment (UE) in a mobile communication network. The method may include: determining to relocate a gateway appropriate for the UE in a case where the UE performs a handover and both the UE and the other party communicating with the UE have capability to support the relocation of the gateway; and delivering a relocation indication to the UE on the basis of the determination.

The case where the UE performs the handover may include: a case where the node in charge of the control plane is changed by the handover; a case where a group ID of the node in charge of the control plane is changed by the handover; a case where a serving gateway (S-GW) is changed by the handover; a case where an ID of a local home network is changed by the handover; and a case where the handover is a handover between a home eNodeB and an eNodeB.

The method may further include receiving a tracking area update (TAU) request message from the UE while the UE performs the handover. The TAU request message may include capability information indicating that both the UE and the other party communicating with the UE have the capability to support the relocation of the gateway.

The relocation indication may be transmitted when a selected gateway is different from a previous gateway as a result of selecting the gateway appropriate for the UE.

The method may further include, after transmitting the relocation indication, receiving a connection request message of a new packet data network (PDN) which uses the same APN as the existing PDN connection from the UE.

The method may further include: after the new PDN connection is created, receiving a disconnection request message of the existing PDN from the UE; or transmitting a delete session request message to an S-GW.

On the other hand, to achieve the above purpose, a disclosure of the present specification provides a method of creating a dedicated bearer. The method may be performed by a local gateway coupled to a home eNodeB. The method may include: establishing a second packet data network (PDN) connection for a user equipment (UE) handed over from an eNodeB to a home eNodeB. Herein, while the second PDN connection is established, an interface may be created between a serving-gateway (S-GW) and a packet data network-gateway (P-GW) to which a first PDN connection is established with the UE before the handover. The method may include: receiving a create request message of the dedicated bearer from a node in charge of a control plane in a mobile communication network through the S-GW, in order to allow a dedicated bearer, which is present in the first PDN connection before the handover, to be also created in the new second PDN connection; and transmitting a message for modifying an IP connectivity access network (IP-CAN) session to a policy and charging rule function (PCRF) through the S-GW and the P-GW, in order to create the dedicated bearer.

The transmitting of the message for modifying the IP-CAN session by the local gateway may include: transmitting, by the local gateway, the message for modifying the IP-CAN session to the S-GW by encapsulating the message into a specific message; delivering the specific message by the S-GW to the P-GW; and extracting, by the P-GW, the message for modifying the IP-CAN session from the specific message, and delivering the message to the PCRF.

On the other hand, to achieve the above purpose, a disclosure of the present specification provides a node which relocates a gateway for a UE in a mobile communication network and which is in charge of a control plane. The node may include: a transceiver; and a processor controlling the transceiver. The processor may perform operations of: determining to relocate a gateway appropriate for the UE in a case where the UE performs a handover and both the UE and the other party communicating with the UE have capability to support the relocation of the gateway; and delivering a relocation indication to the UE on the basis of the determination.

On the other hand, to achieve the above purpose, a disclosure of the present specification provides a local gateway coupled to a home eNodeB. The local gateway may include: a transceiver; and a processor controlling the transceiver. The processor may establish a second packet data network (PDN) connection for a user equipment (UE) handed over from an eNodeB to a home eNodeB. Herein, while the second PDN connection may be established, an interface is created between a serving-gateway (S-GW) and a packet data network-gateway (P-GW) to which a first PDN connection is established with the UE before the handover. The processor may receive a create request message of the dedicated bearer from a node in charge of a control plane in a mobile communication network through the S-GW, in order to allow a dedicated bearer, which is present in the first PDN connection before the handover, to be also created in the new second PDN connection. Further, the processor may transmit a message for modifying an IP connectivity access network (IP-CAN) session to a policy and charging rule function (PCRF) through the S-GW and the P-GW, in order to create the dedicated bearer.

According to a disclosure of the present specification, problems of the conventional technique can be solved.

Figure 1:
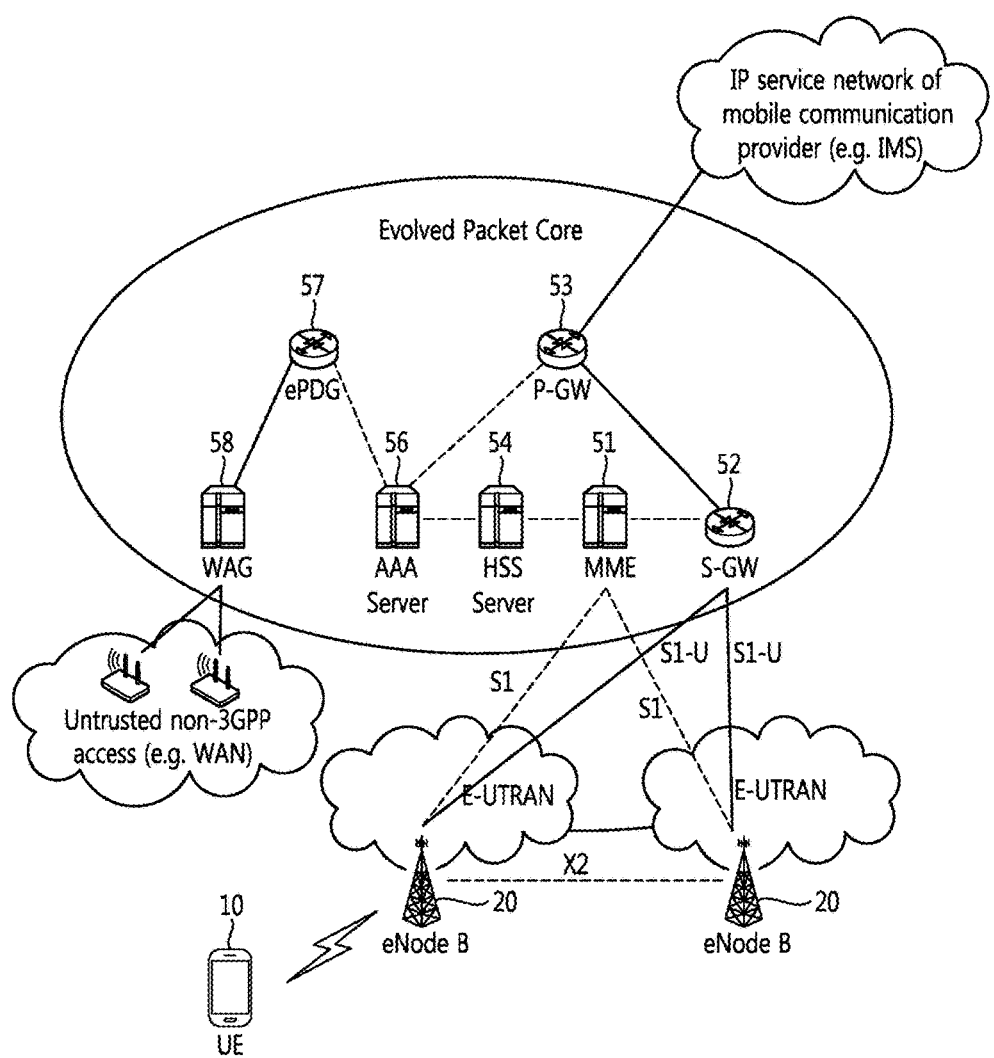
FIG. 1 is a structural diagram of an evolved mobile communication network.
Figure 2:
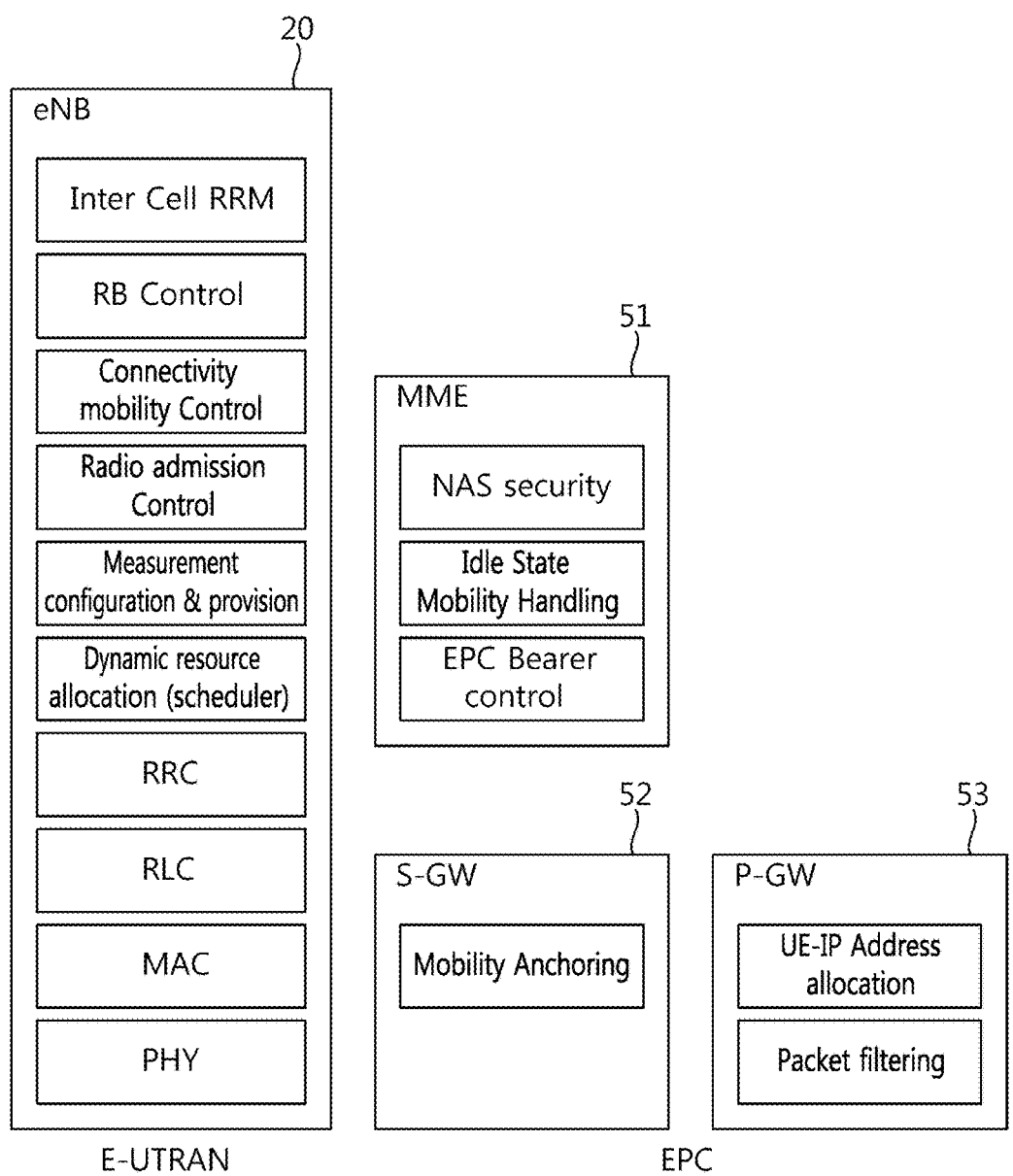
FIG. 2 is an exemplary diagram illustrating architectures of a general E-UTRAN and a general EPC.
Figure 3:
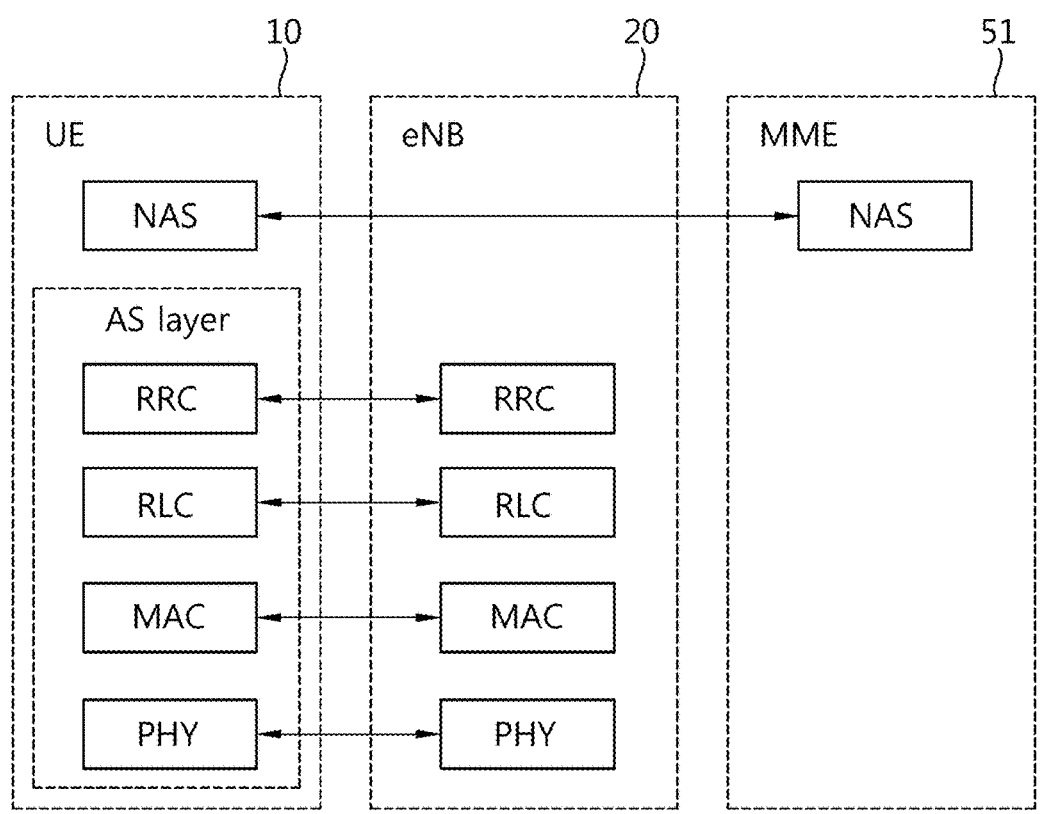
FIG. 3 is an exemplary diagram illustrating a structure of a radio interface protocol on a control plane between UE and eNodeB.
Figure 4:
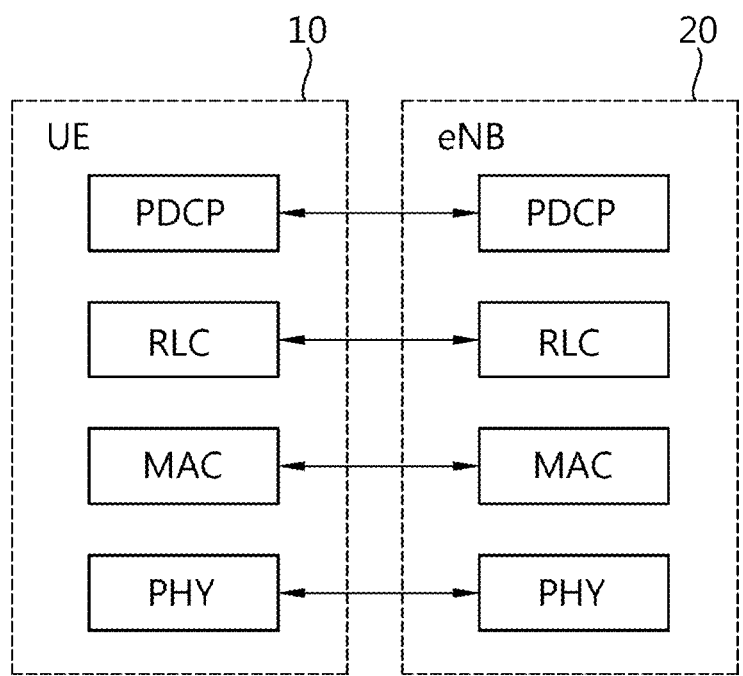
FIG. 4 is another exemplary diagram illustrating a structure of a radio interface protocol on a user plane between the UE and a base station.
Figure 5A:
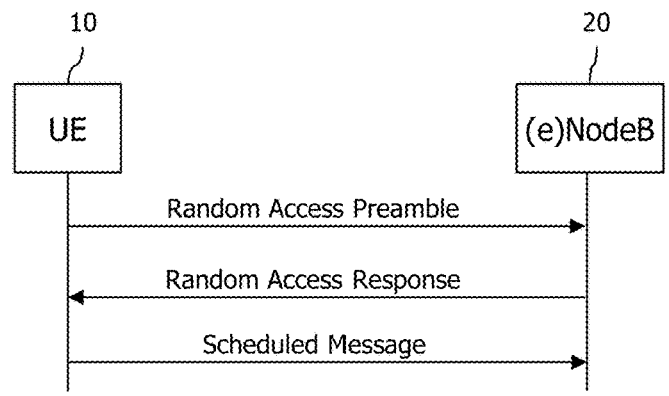
FIG. 5a is a flowchart illustrating a random access process in 3GPP LTE.
Figure 5B:
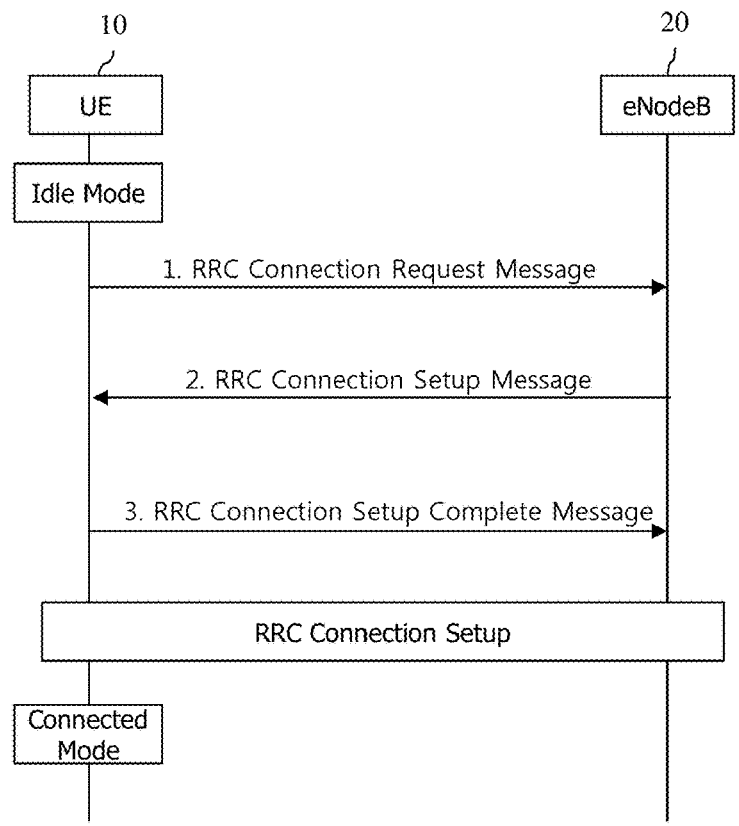
FIG. 5b illustrates a connection process in a radio resource control (RRC) layer.
Figure 6:
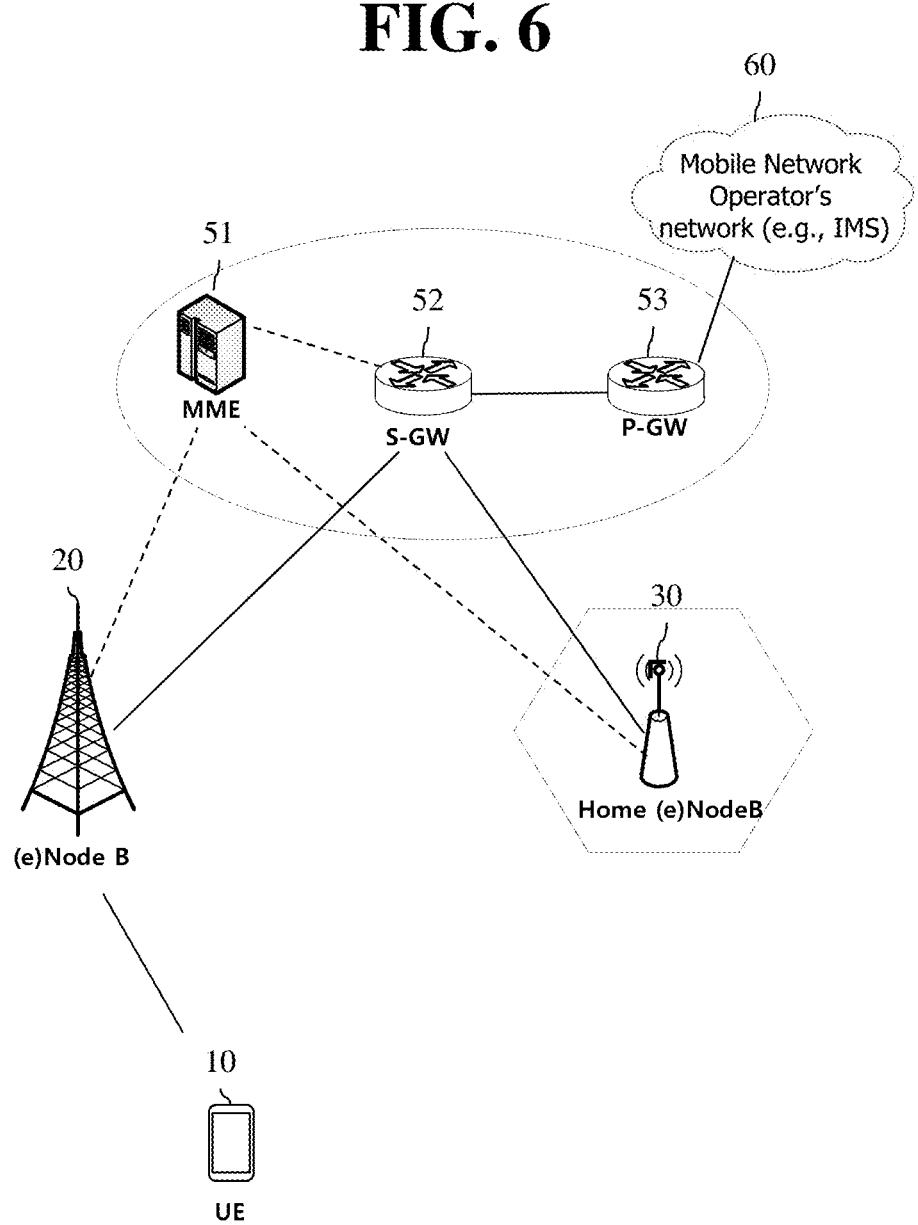
FIG. 6 is a diagram illustrating the relationship between (e)NodeB and Home (e)NodeB.
Figure 7:
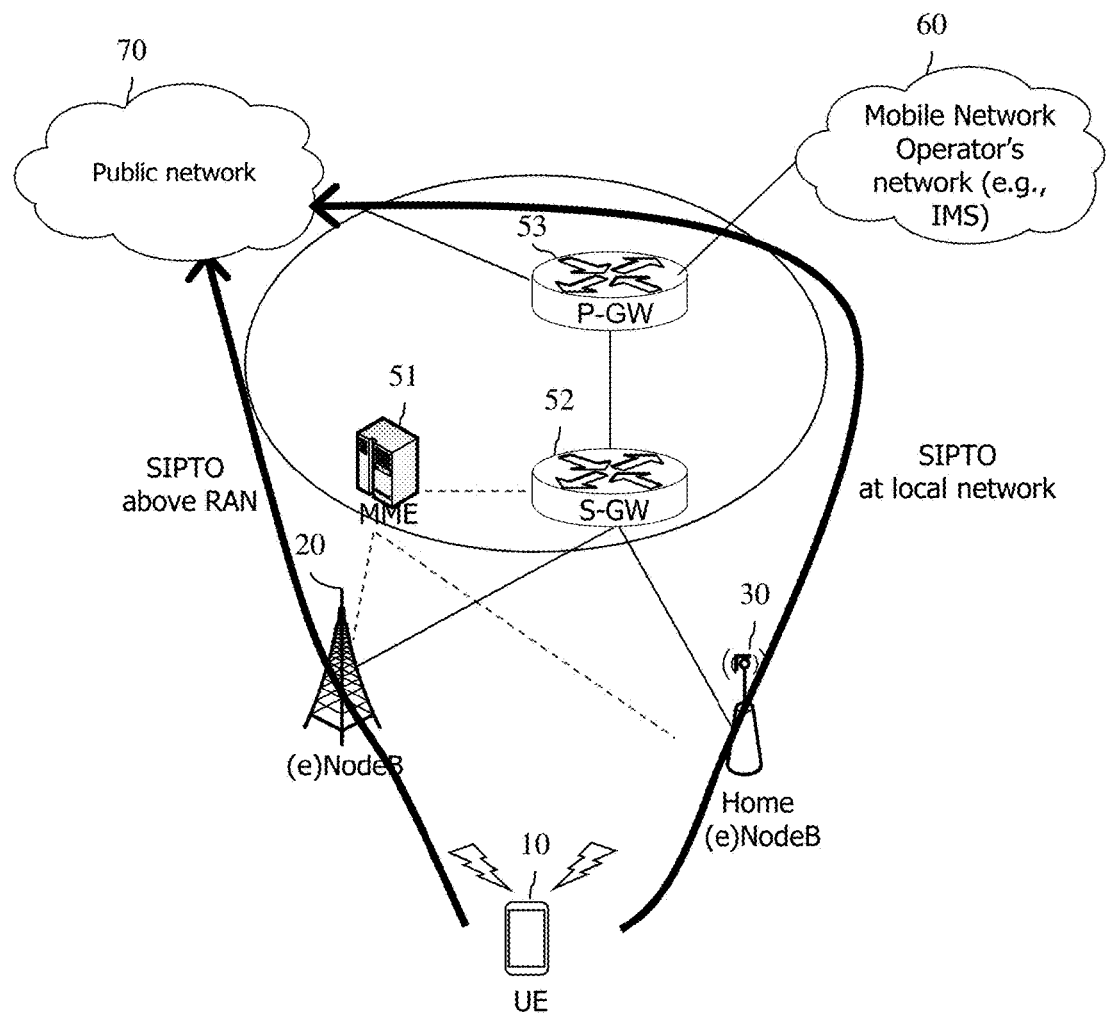
FIG. 7 shows the concept of a selected IP traffic offload (SIPTO).
Figure 8:
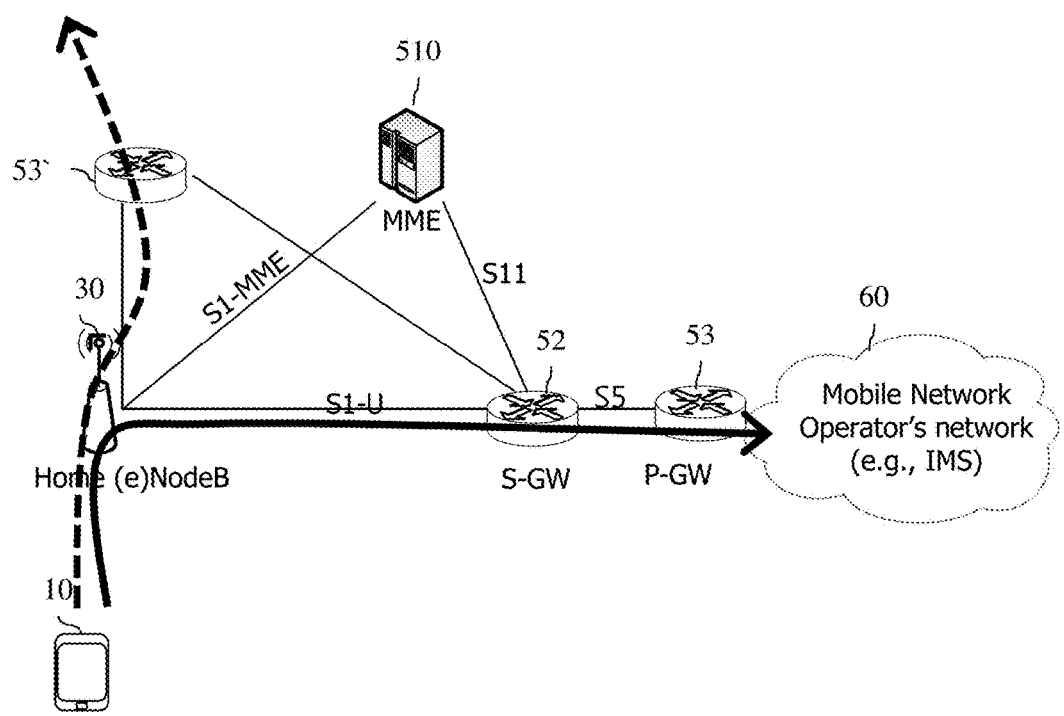
FIG. 8 shows an example of a traffic path according to whether SIPTO is applied in a home (e)NodeB.
Figure 9A:
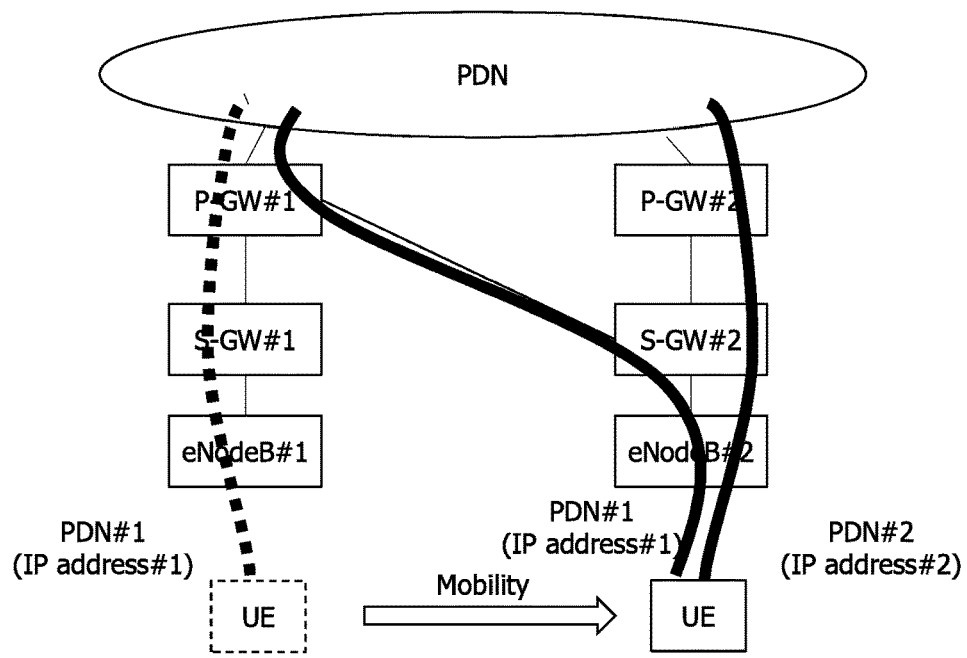
FIG. 9A shows an example in which an 'SIPTO above RAN' scheme is applied when a UE moves.
Figure 9B:
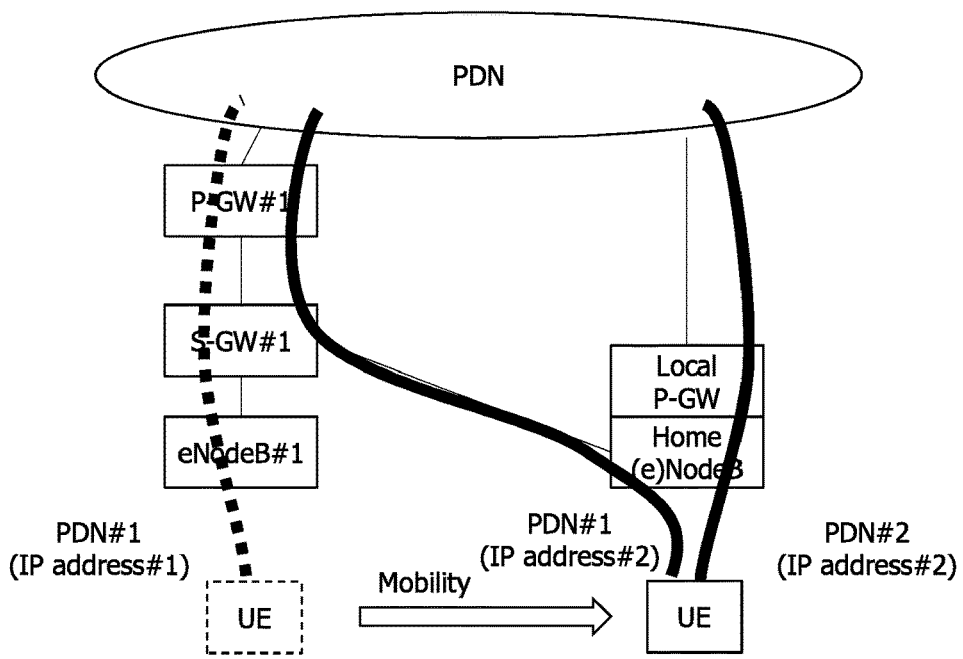
FIG. 9B shows an example of applying an 'SIPTO at local network' scheme when a UE moves.

DESCRIPTION OF EXEMPLARY
EMBODIMENTS

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

RAT: an abbreviation of Radio Access Technology. Means GERAN, UTRAN, E-UTRAN, etc.

MPTCP: It is an abbreviation of Multi-Path Traffic Control Protocol. A multipath TCP is a user interface such as TCP. Although a typical TCP interface is provided in this case, the existing TCP is improved so that data can be spread to several sub-flows.

SIP: It is an abbreviation of Session Initiation Protocol. The SIP is a communication protocol for controlling a multimedia communication session. The most typical application using the SIP is an instant message as well as an Internet telephony for voice and video telephony.

<First Disclosure of the Present Specification>

Meanwhile, an embodiment proposed hereinafter may be implemented alone, or may be implemented by combining several embodiments.

According to a disclosure of the present specification, a UE is improved to inform a network that it has capability to support a relocation of a P-GW. Herein, when both a transmitting side and a receiving side, e.g., a UE and an application server (AS)/application function (AF), support the relocation of the P-GW, the capability to support the relocation of the P-GW is set to "supported". For example, when both the UE and the AS/AF use a protocol which supports session continuity, the capability to support the relocation of the P-GW is set to "supported". For example, when the UE and the AS/AF use an MPTCP protocol or an SIP protocol, the capability to support the relocation of the P-GW may be set to "supported". In addition, when the UE uses not only simply whether a protocol is supported but also service continuity using the protocol in a real application, the capability to support the relocation of the P-GW is set to "supported". For example, when the UE supports the MPTCP protocol and uses the service continuity using the MPTCP in the real application, the capability to support the relocation of the P-GW is set to "supported". If the UE supports the MPTCP protocol but cannot use a procedure for service continuity or uses it in the same way as a normal TCP, the capability to support the relocation of the P-GW is set to "not supported". As such, the capability to support the relocation of the P-GW varies depending on the other party for communication and an application in use. Therefore, the UE always has to verify whether it has the capability to support the relocation of the P-GW with the other party for communication. For this, while communicating with the other party, the application of the UE verifies whether both of them have the capability to support the relocation of the P-GW, and reports capability information to a NAS layer. Such a verification process may be performed when a specific event occurs, for example, when communication is started or an application is executed according to the setting of the UE. In addition, when only some applications use the service continuity even if the UE does not use the service continuity in all applications currently being executed, the capability to support the relocation of the P-GW may be set to "supported". In this case, an example of an application not using the service continuity may include a web browser or the like.

Figure 10:
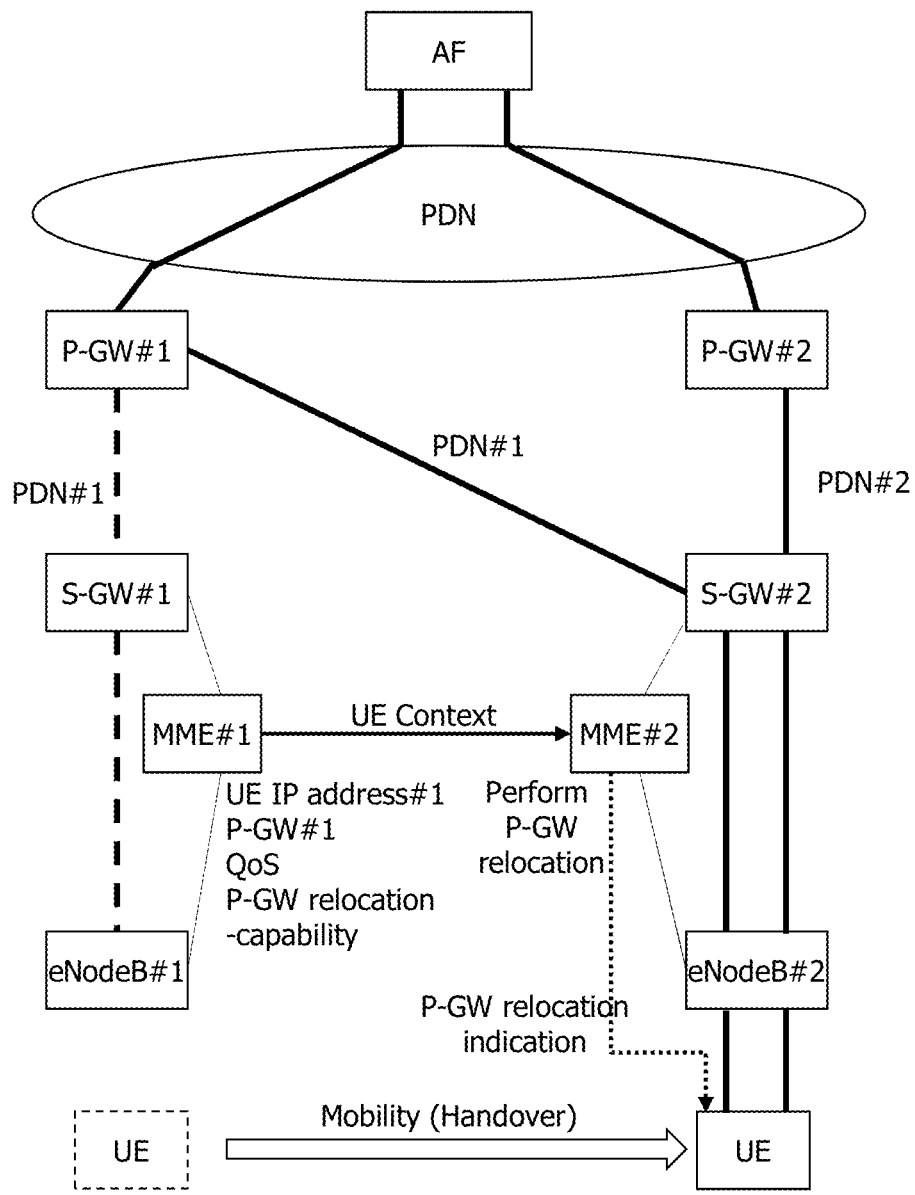
FIG. 10 is a schematic view showing a first method according to a first disclosure of the present specification.

FIG. 10 is a schematic view showing a first method according to a first disclosure of the present specification.

As can be seen with reference to FIG. 10, a UE creates a PDN#1 through an eNodeB#1, an S-GW#1, and a P-GW#1, and exchanges data with an application function (AF).

Thereafter, the UE moves to coverage of an eNodeB#2, and thus a handover procedure is performed.

During the handover procedure is performed, the UE transmits a TAU request message to perform a tracking area update (TAU) procedure. Herein, the UE allows the TAU request message to include information regarding capability to support a relocation of the P-GW. As such, according to the disclosure of the present specification, it is improved to deliver the information of the capability to support the relocation of a P-GW when the UE performs the TAU procedure during the handover procedure. However, when the UE performs the TAU periodically, the information regarding the capability to support the relocation of the P-GW may not be delivered. The UE may always transmit the capability information when the TAU procedure is performed according to the handover. However, for optimization, by default, when the capability information is "not supported", the capability information is not transmitted, and when the capability information is changed from "not supported" to "supported", the capability information is transmitted.

Upon receiving the TAU request message, an MME#2 coupled to the eNodeB#2 determines whether to relocate the P-GW for the UE on the basis of the capability to support the relocation of the P-GW, included in the TAU request message.

When the UE continuously moves, the handover occurs several times, which may result in a change in an S-GW. In this case, data is delivered through many routers between the P-GW and the S-GW.

Therefore, the disclosure of the present specification determines whether there is a need to relocate the P-GW in the following cases. Herein, the MME remembers the relocated P-GW.

i. When both a transmitting side and a receiving side have capability to support the relocation of the P-GW, and ii. When the MME is changed by a handover, or iii. When a group ID of the MME is changed by the handover (e.g., DECOR), or iv. When the S-GW is changed by the handover, or v. When a local home network ID is changed by the handover (e.g., a change from a local P-GW#1 to a local P-GW#2), or vi. When a handover occurs from an eNodeB to a home eNodeB or from the home eNodeB to the eNodeB (i.e., a change from a P-GW to a local P-GW)

The above conditions may be used independently one by one, or two or more conditions may be used in combination.

As a result of selecting a P-GW appropriate for the UE by the MME, when the selected P-GW#2 is different from the previous P-GW#1, the MME delivers to the UE an indication indicating that there is a need to relocate the P-GW. Herein, the indication may be delivered by using a NAS notification message.

Upon receiving the indication, the UE transmits a PDN connectivity request message to the MME in order to additionally create a PDN#2 having the same APN as that of the previously connected PDN#1. In this case, the UE sets a request type in the PDN connectivity request message to the relocation of the P-GW.

When the request type in the PDN connectivity request message is set to the relocation of the P-GW, the MME may know that the NAS notification message has been successfully delivered.

Meanwhile, after the PDN#2 is created, all IP flows in the PDN#1 shall be moved to the PDN#2. However, if there is a dedicated bearer in the PDN#1, the dedicated bearer is necessarily created also in the PDN#1. There are two methods for this.

i. Initiation by the UE: The UE transmits a request bearer resource modification message to the MME.

ii. Initiation by the MME: The MME transmits a bearer resource command to the P-GW.

When the dedicated bearer is created in the new PDN#2 by using one of the above two methods, the UE performs an operation of moving traffic of the existing PDN#1 to the PDN#2 by using MPTCP/SIP signaling or the like.

When all of the traffic is successfully moved to the PDN#2, no data is transmitted using the existing PDN#1. Then, there is a need to release the existing PDN#1. As such, there are two methods for releasing the existing PDN#1.

i. Initiation by the UE: After the UE moves all IP flows, a PDN disconnection request message is transmitted to the MME.

ii. Initiation by the MME: When the MME creates a new PDN#2 upon receiving a PDN connectivity request message including a request type which is set to the relocation of the P-GW, a timer is driven, and a delete session request message is transmitted to the S-GW when the timer expires.

When the existing PDN#1 is released by using one of the above two methods, the relocation of the P-GW is complete.

Figure 11A:
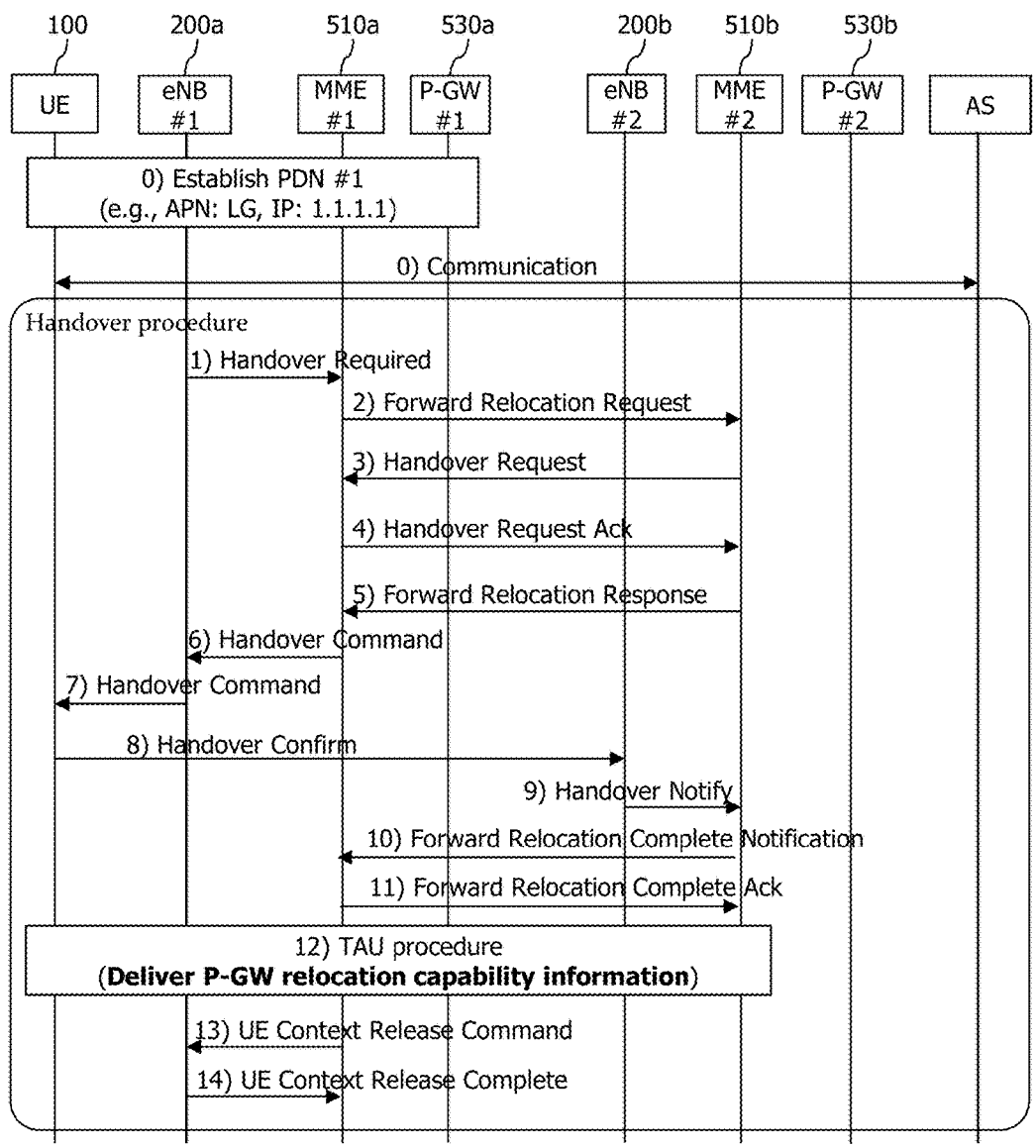
FIG. 11A and FIG. 11B are flowcharts illustrating a first method of FIG. 10 in detail.
Figure 11B:
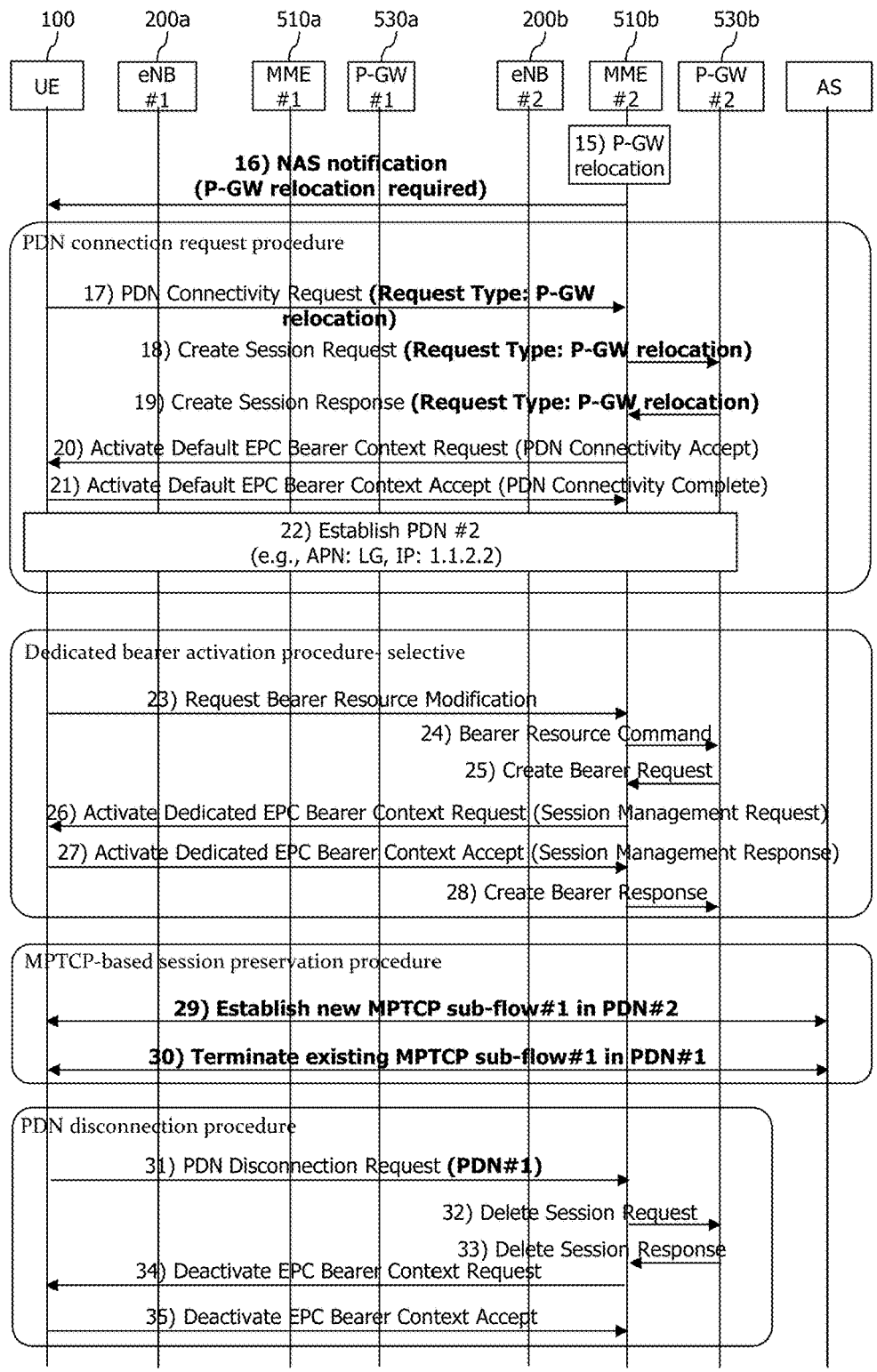

FIG. 11A and FIG. 11B are flowcharts illustrating a first method of FIG. 10 in detail.

The flowcharts shown in FIG. 11A and FIG. 11B relate to an example in which a UE 100 relocates a P-GW by using MPTCP. When the UE 100 moves while using the PDN#1 through a P-GW#1 530*a*, a new PDN#2 is created through a P-GW#2 530*b*, and a P-GW relocation procedure is performed. Specifically, the followings are performed.

First, the UE 100 cooperates with an MME#1 510*a* to establish the PDN#1 which passes through an eNodeB#1 200*a* and the P-GW#1 530*a*. In this case, an IP address of the UE 100 is 1.1.1.1. The UE 100 communicates with an AS by using the PDN#1.

1)-14) Thereafter, a handover procedure is performed when the UE 100 moves to coverage of an eNodeB#2 200*b*. During the handover procedure, the UE 100 transmits a TAU request message to perform a TAU procedure. In this case, the UE 100 allows the TAU request message to include P-GW relocation capability information. For example, when both the UE 100 and the AS support MPTCP, the UE 100 may set the P-GW relocation capability information to "supported".

15)-16) After the handover is complete, when one or more of the above conditions are satisfied and thus the P-GW#2 530*b* is selected as a result of selecting a P-GW appropriate for the UE, a NAS notification message including an indication indicating that there is a need to relocate the P-GW is transmitted to the UE 100.

17)-22) Upon receiving the indication, the UE 100 creates a new PDN#2 with the same APN as the existing PDN#1. Accordingly, the IP address assigned to the UE 100 may be, for example, 1.2.2.2.

23)-27) In addition, a procedure for creating the same dedicated bearer as the dedicated bearer in the previous PDN#1 is performed.

29)-30) The UE 100 creates a sub-flow of the MPTCP and forwards a session to the new PDN#2.

31)-35) Thereafter, the UE 100 disconnects the PDN#1. As such, when the existing PDN#1 is disconnected, the relocation of the P-GW is complete.

Figure 12:
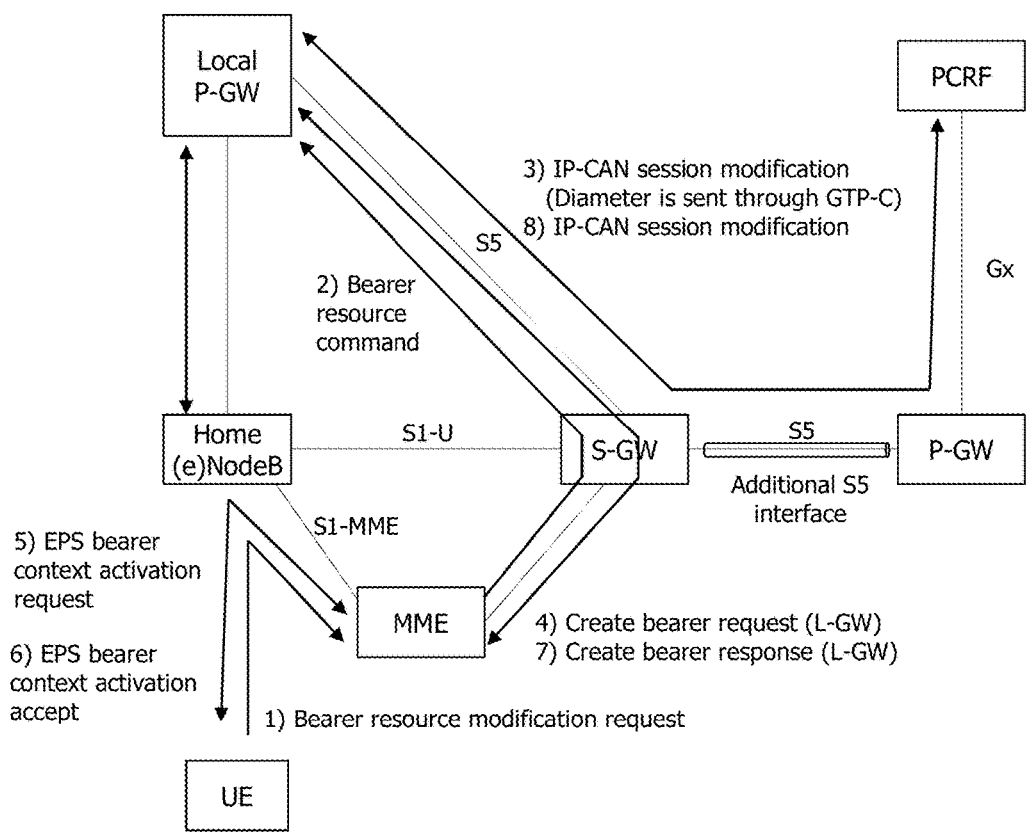
FIG. 12 is a schematic view showing a second method according to a first disclosure of the present specification.

FIG. 12 is a schematic view showing a second method according to a first disclosure of the present specification.

The second method relates to a situation where a UE performs a handover from an eNodeB to a home eNodeB. As such, when the handover to the home eNodeB is performed, in case of creating a new PDN which passes through a local P-GW, the local P-GW cannot support a dedicated bearer. Therefore, all IP flows using the existing PDN may not be able to be forwarded to the new PDN. To solve this problem, the second method suggests a method in which the local P-GW can create the dedicated bearer through signaling between the local P-GW and a PCRF. Herein, since there is no interface between the local P-GW and the PCRF, the second method allows the local P-GW to deliver signaling to the PCRF via the S-GW and the P-GW. For this, an additional S5 interface is allowed to be created between the S-GW and the P-GW in the process of creating the new PDN.

FIG. 12 shows a process subsequent to a process in which a UE is handed over to a home eNodeB and creates a new PDN, i.e., a process of activating a dedicated bearer.

The UE transmits a request bearer resource modification message to an MME. Alternatively, instead of the UE transmitting the message, the MME may transmit a bearer resource command message.

The message transmitted by the UE is delivered to the local P-GW.

The local P-GW performs an IP-CAN session modification procedure with respect to a PCRF to create a dedicated bearer. In this case, since there is no interface between the local P-GW and the PCRF, the local P-GW transmits to the S-GW a diameter message for modifying the IP connectivity access network (IP-CAN) session with respect to the PCRF by encapsulating it into a GTP-C message, and the S-GW delivers this to the P-GW via the additionally created S5 interface. The P-GW delivers to the PCRF the diameter message in the message received from the local P-GW. Upon receiving the diameter message from the PCRF, the P-GW delivers it to the local P-GW in the same manner.

Then, the local P-GW allows to ensure QoS between the home eNodeB and the local P-GW through signaling with respect to the home eNodeB.

The local P-GW transmits a create bearer request message to the S-GW. In this case, information indicating that the create bearer request message is transmitted by the local P-GW to the MME is allowed to be included, so that the S-GW does not allocate a resource for the dedicated bearer. The S-GW delivers the create bearer request message to the MME. Upon receiving the create bearer request message, the MME instructs the home eNodeB to allocate a required radio resource between the UE and the home eNodeB.

5)-6) The home eNodeB transmits an EPC dedicated bearer context activation request message to the UE according to an instruction from the MME, and receives an EPC dedicated bearer context activation accept message from the UE.

7) Then, the MME transmits a create bearer response message to the local P-GW via the S-GW to inform that radio resource allocation is successfully complete.

If the dedicated bearer is successfully created, the local P-GW performs the IP-CAN with respect to the PCRF once again, and informs the PCRF that the dedicated bearer activation is complete.

Figure 13:
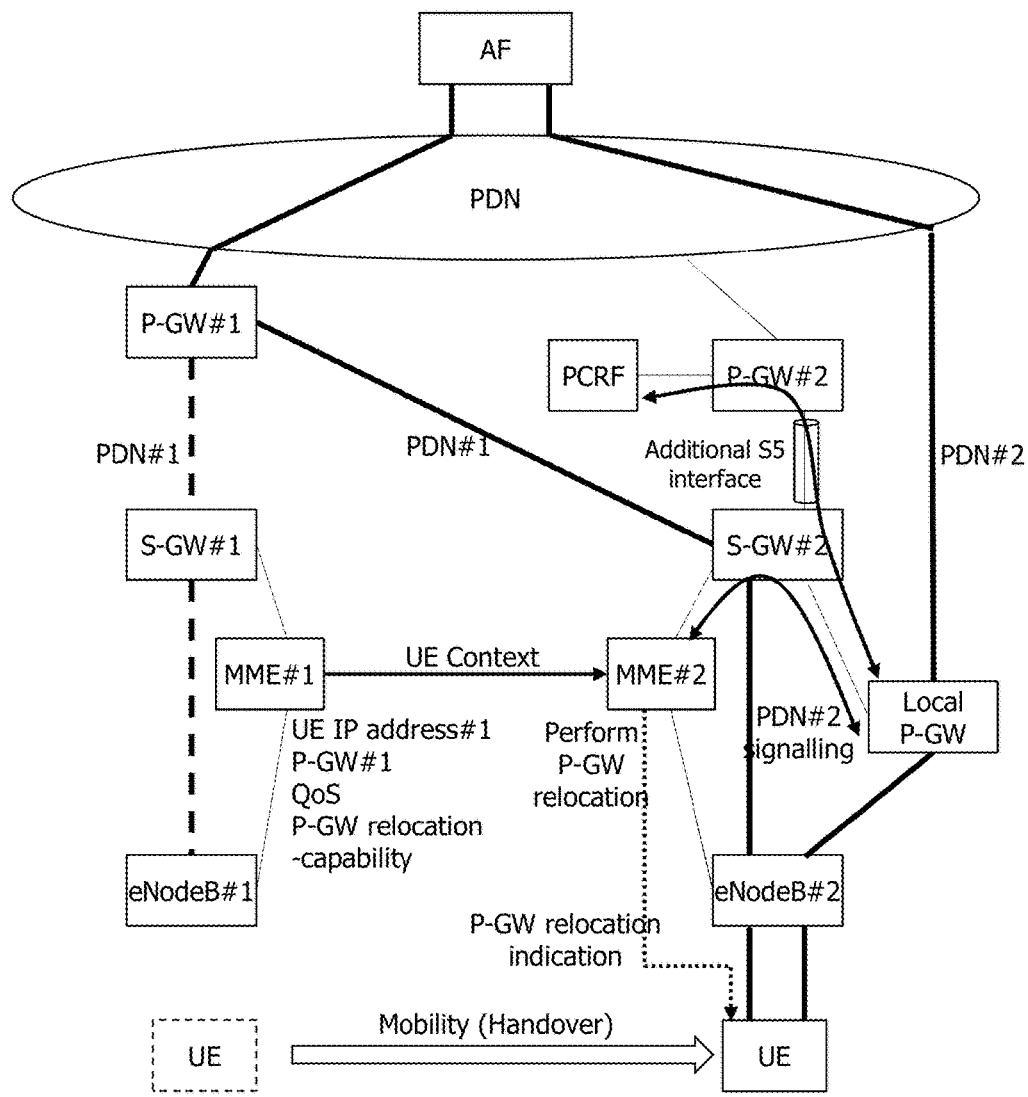
FIG. 13 is a schematic view showing a second method of FIG. 12 in a different manner.

FIG. 13 is a schematic view showing a second method of FIG. 12 in a different manner.

As shown in FIG. 13, general signaling transmitted by an MME#2 is delivered to a local P-GW via an S-GW#2. However, when the local P-GW transmits IP-CAN signaling to an S-GW for a dedicated bearer, the S-GW encapsulates the IP-CAN signaling into GTP and then relays it to the P-GW through the additional S5 interface of FIG. 12. Then, the P-GW delivers this to the PCRF. Subsequently, upon receiving a message through the PCRF, the P-GW encapsulates it into the GTP, and thereafter transmits it to the S-GW through the S5 interface. The S-GW transmits the message to the local P-GW. Accordingly, creation of the dedicated bearer is complete. Then, the local P-GW notifies the PCRF that the dedicated bearer is successfully complete through the S-GW and the P-GW.

<Second Disclosure of the Present Specification>

Meanwhile, it is expected to realize a data service with a minimum speed of 1 Gbps in a next generation mobile communication, so-called 5th generation mobile communication. Accordingly, an overload of a mobile communication core network is expected to be more increased.

Therefore, in the so-called fifth generation mobile communication, it is urgently required to redesign the core network.

Figure 14:
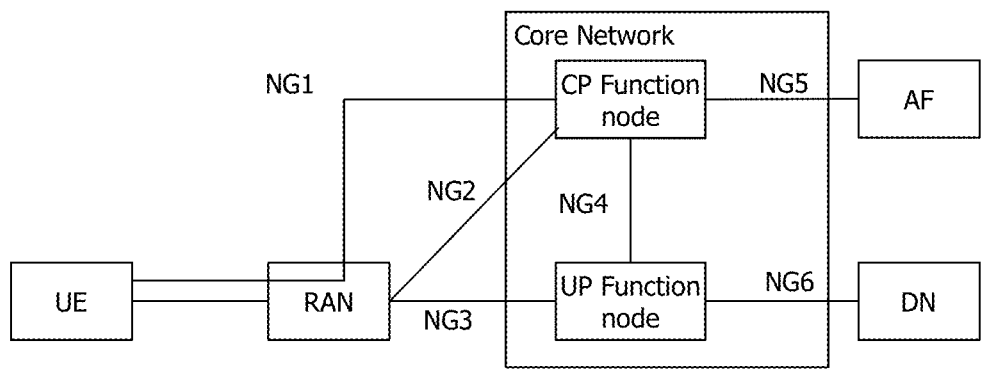
FIG. 14 shows an expected structure of a core network of a next generation mobile communication according to a second disclosure of the present specification.

FIG. 14 shows an expected structure of a core network of a next generation mobile communication according to a second disclosure of the present specification.

As can be seen with reference to FIG. 14, a UE may be coupled to the core network via a next generation radio access network (RAN). The next generation core network may include a control plane (CP) function node and a user plane (UP) function node. The CP function node is a node which manages the UP function nodes and the RAN, and transmits/receives a control signal. The CP function node performs all or some parts of functions of an MME of a fourth generation mobile communication. The UP function node is a type of a gateway through which user data is transmitted/received. The function node performs all or some parts of functions of the S-GW and P-GW of the fourth generation mobile communication.

An application function (AF) node is an application server located within a data network (DN).

Figure 15A:
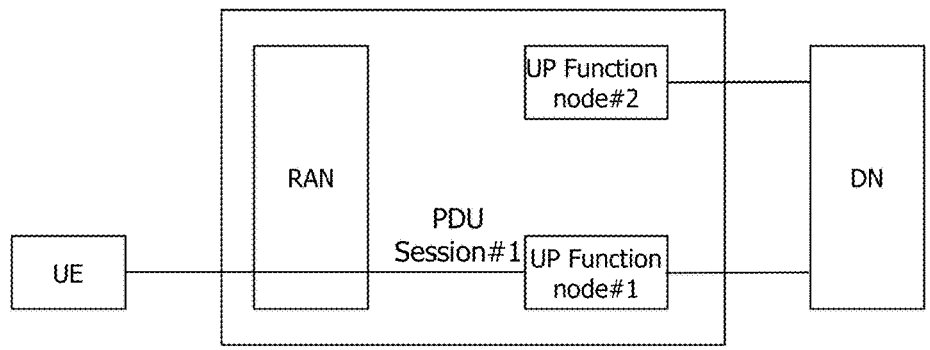
FIG. 15A to FIG. 15C show an expected handover of a UE in next generation mobile communication.
Figure 15B:
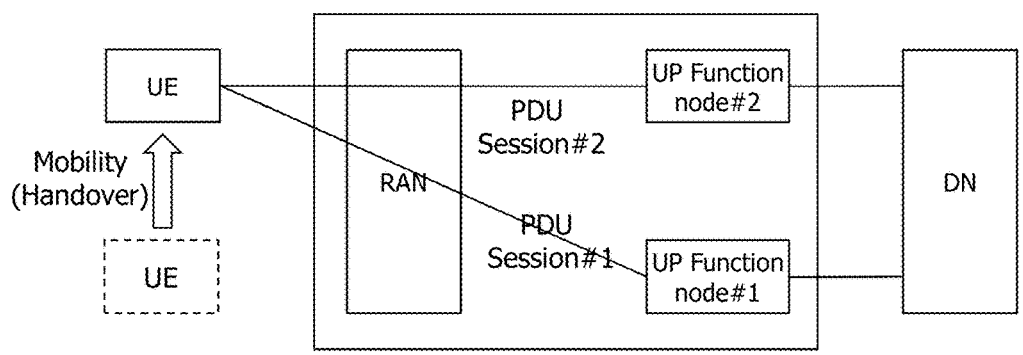
Figure 15C:
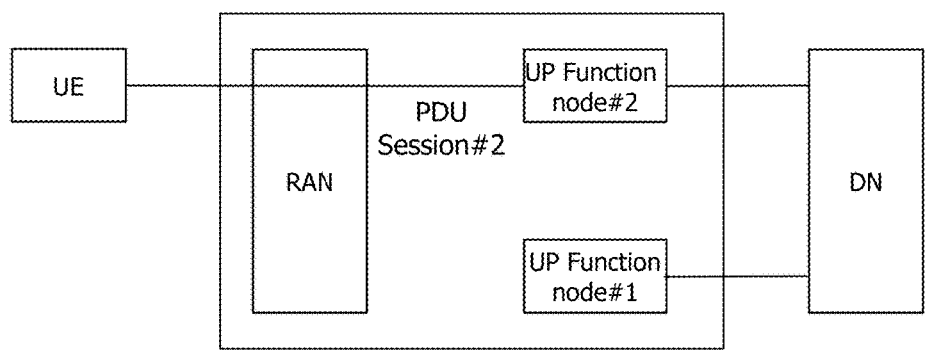

FIG. 15A to FIG. 15C show an expected handover of a UE in next generation mobile communication.

As shown in FIG. 15A, the UE has a PDU session#1 directed to a data network (DN) via an UP function node#1 through a RAN.

Thereafter, as shown in FIG. 15B, when the UE moves to another area, a handover is performed, thereby creating a PDU session#2 directed to the DN via the UP function node#1.

As shown in FIG. 15C, when the handover is complete, only the PDU session#2 is left, and the PDU session#1 is released.

As shown in FIG. 15A to FIG. 15C, when the handover is performed in the next generation mobile communication, the idea of the first disclosure of the present specification can be applied. This will be described with reference to FIG. 16.

Figure 16:
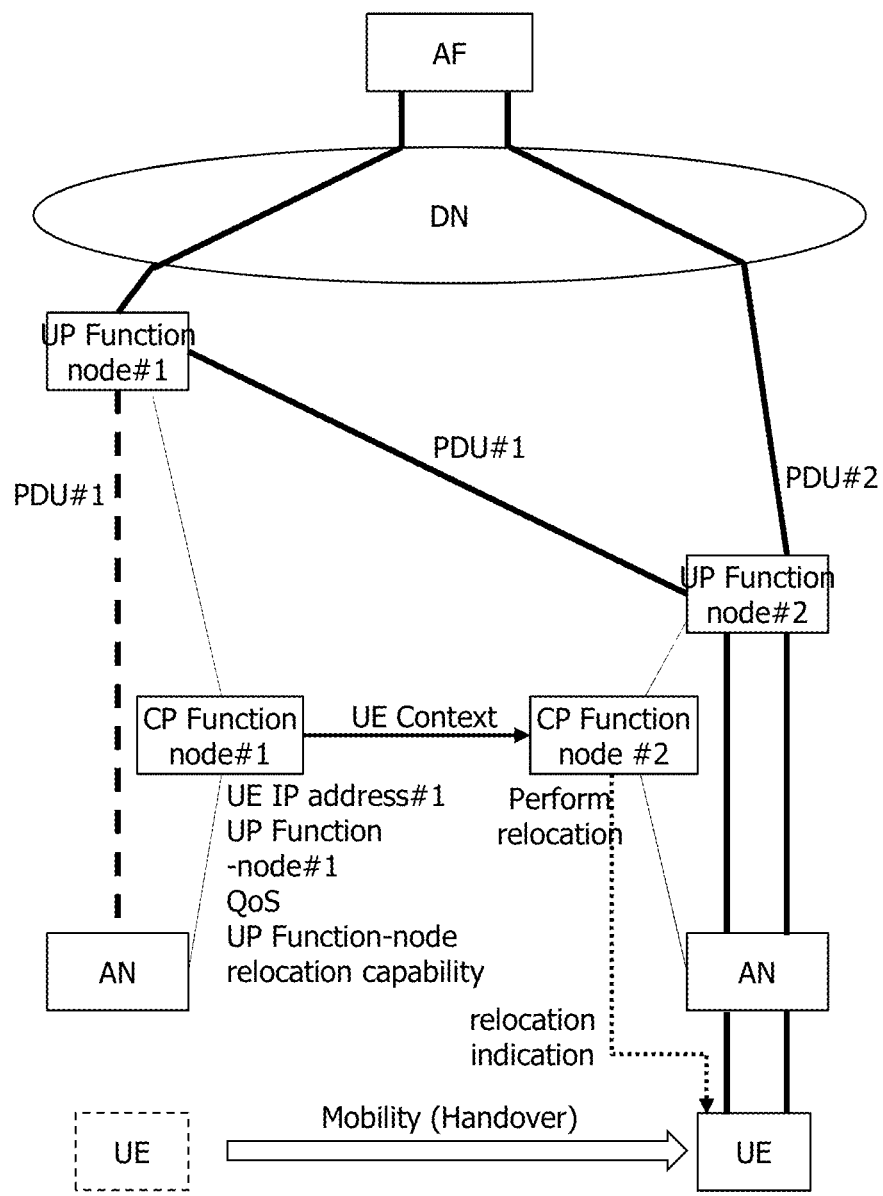
FIG. 16 is a schematic view showing an example of applying a method according to a first disclosure of the present application to next generation mobile communication according to a second disclosure.

FIG. 16 is a schematic view showing an example of applying a method according to a first disclosure of the present application to next generation mobile communication according to a second disclosure.

When applying the method according to the first disclosure of the present application, both an AF and a UE have to support upper layer service continuity. For example, when using protocols such as MPTCP, SIP, etc., both the UE and the AF can be used. In this case, the UE shall inform a CP function node that it has capability to support a relocation of the UP function node (or capability to support upper layer session/service continuity). Alternatively, the CP function node may identify capability of the UE and the AF when a PDU session is created or after the PDU session is created. If the CP function node identifies the capability to support the relocation of the UP function node of the UE and the AF after the PDU session is created, the UE may be informed of whether the relocation of the UP function node is supported for the created PDU session.

According to the second disclosure of the present specification, the CP function node determines whether the relocation of the UP function node is necessary in the following cases.

i. When both the UE and the AF have capability to support the relocation of the UP function node, and
    ii. When the CP function node is changed by a handover
    iii. When there is an UP function node closer to the UE after the handover
    iv. When load balancing is required between the UP function nodes
    v. When it is necessary to transmit data that can only be served through a specific UP function node (e.g., when it is necessary to be served through a local GW such as edge computing)

Each of the above conditions may be used alone, or one or more conditions may be used in combination.

As shown in FIG. 16, upon receiving an indication indicating that the relocation is necessary from the CP function node#2, the UE performs a process of newly creating a PDU session#2 with the same DN. Alternatively, when the UE determines that the reallocation of the UP function node is necessary, this may be informed to the CP function node. As such, when the PDU session#2 is newly created, two PDU sessions (i.e., PDU session#1 and PDU session#2) exist temporarily for the same DN between the UE and the DN.

Then, the UE and the AF perform a process of transferring data transmitted through the existing PDU session#1 to the newly created PDU session#2. When this process ends, the UE directly releases the previously used PDU session#1. Alternatively, when the CP function node determines that the PDU session#1 is no longer used, the PDU session#1 may be released. The CP function node may determine this by using a method such as a method of using a timer value, a method of monitoring an event from the UP function node, and a method based on an indication received from the UE or the AR Although a situation where the CP function node#1 changes to the CP function node#2 due to the handover is shown in FIG. 16, the aforementioned description may also be applied to a situation where the CP function node does not change and only the UP function node changes (e.g., a situation where load balancing of the UP function node is changed from a central UP function node to the local UP function node).

The content described up to now can be implemented in hardware. This will be described with reference to FIG. 17.

Figure 17:
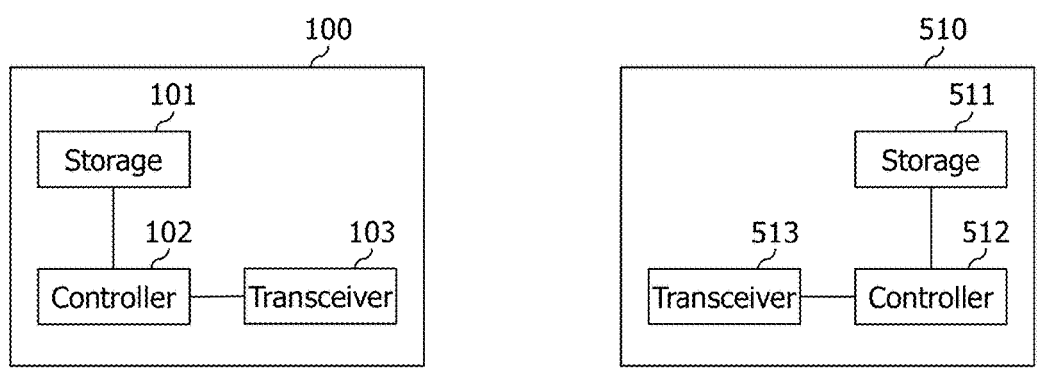
FIG. 17 is a block diagram of a UE 100 and a network node according to an embodiment of the present invention.

FIG. 17 is a block diagram of a UE 100 and a network node according to an embodiment of the present invention.

As shown in FIG. 17, the UE 100 includes a storing unit 101, a controller 102, and a transceiver 103. Further, the network node may be the MME 510. The network node includes a storing unit 511, a controller 512, and a transceiver 513.

The storing units store the aforementioned method.

The controllers control the storing units and the transceivers. More specifically, the controllers respectively execute the methods stored in the storing units. Further, the controllers transmit the aforementioned signals via the transceivers.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method of relocating a gateway, the method performed by a node, which is in charge of a control plane, for a user equipment (UE) in a mobile communication network, and the method comprising:

receiving a tracking area update (TAU) request message from the UE while the UE performs a handover,
    wherein the TAU request message comprises capability information indicating that both the UE and another party communicating with the UE have a capability to support a relocation of the gateway;
    determining to relocate a gateway appropriate for the UE based on (i) the UE performing the handover and (ii) that both the UE and the other party communicating with the UE have the capability to support the relocation of the gateway; and
    delivering a relocation indication to the UE on the basis of the determination.

2. The method of claim 1,
    wherein the node in charge of the control plane is changed by the handover;
    wherein a group ID of the node in charge of the control plane is changed by the handover;
    wherein a serving gateway (S-GW) is changed by the handover;
    wherein an ID of a local home network is changed by the handover; or
    wherein the handover is a handover between a home eNodeB and an eNodeB.

3. The method of claim 1, wherein the relocation indication is transmitted when a selected gateway is different from a previous gateway as a result of selecting the gateway appropriate for the UE.

4. The method of claim 1, further comprising:
    after transmitting the relocation indication, receiving a connection request message for a new packet data network (PDN) which uses the same access point name (APN) as an existing PDN connection from the UE.

5. The method of claim 4, further comprising:
    after the new PDN connection is created, receiving a disconnection request message for the existing PDN connection from the UE; or
    transmitting a delete session request message to an S-GW.

6. A node which relocates a gateway for a user equipment (UE) in a mobile communication network and which is in charge of a control plane, the node comprising:
    a transceiver; and
    a processor, operatively coupled to the transceiver, wherein the processor:
    controlling the transceiver to receive a tracking area update (TAU) request message from the UE while the UE performs a handover,
    wherein the TAU request message comprises capability information indicating that both the UE and another party communicating with the UE have a capability to support a relocation of the gateway;
    determining to relocate a gateway appropriate for the UE based on (i) the UE performing the handover and (ii) that both the UE and the other party communicating with the UE have the capability to support the relocation of the gateway; and
    delivering a relocation indication to the UE on the basis of the determination.

7. The node of claim 6,
    wherein the node in charge of the control plane is changed by the handover;

wherein a group ID of the node in charge of the control plane is changed by the handover;

wherein a serving gateway (S-GW) is changed by the handover;

wherein an ID of a local home network is changed by the handover, or wherein the handover is a handover between a home eNodeB and an eNodeB.

8. The node of claim 6, wherein the processor receives through the transceiver a connection request message for a new packet data network (PDN) which uses the same access point name (APN) as an existing PDN connection from the UE, after transmitting the relocation indication.

9. The node of claim 8, wherein after the new PDN connection is created, the processor receives a disconnection request message for the existing PDN connection from the UE, or transmits a delete session request message to an S-GW.

* * * * *